Figure 1:
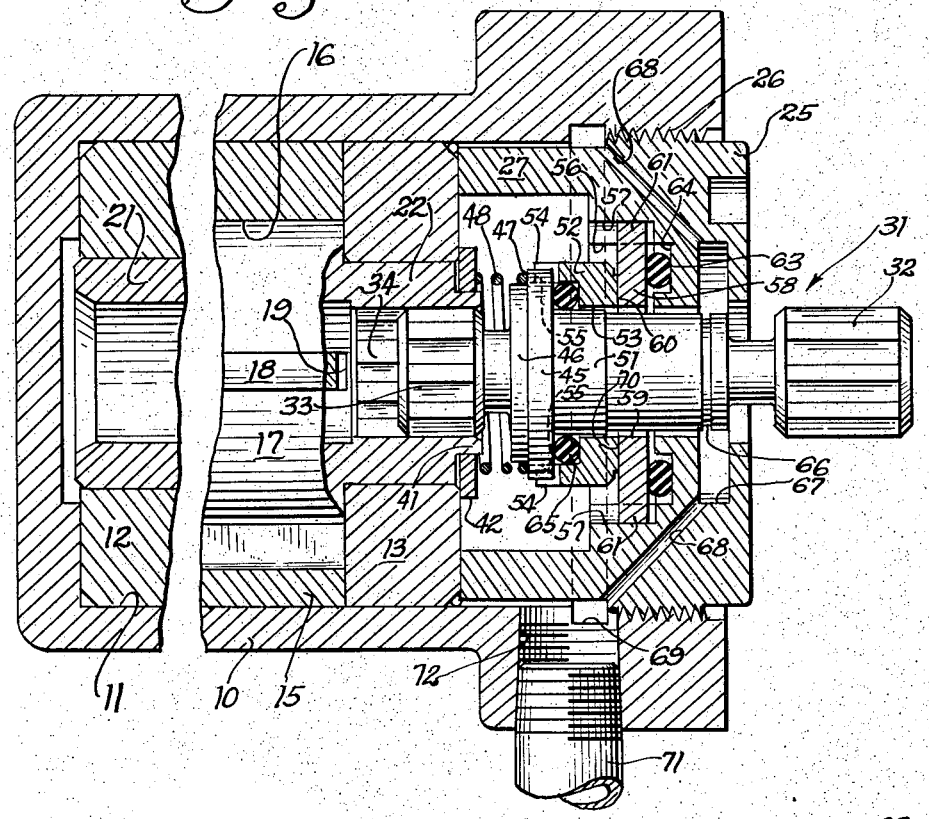

June 1, 1954  LE ROY H. BARR  2,680,031
SHAFT SEALING STRUCTURE
Filed Feb. 3, 1951

INVENTOR.
LeRoy H. Barr
BY
Leonard S. Knopfeld
Attorney

Patented June 1, 1954

2,680,031

UNITED STATES PATENT OFFICE 2,680,031

SHAFT SEALING STRUCTURE

Le Roy H. Barr, Elyria, Ohio, assignor to Lear, Incorporated, Grand Rapids, Mich.

Application February 3, 1951, Serial No. 209,310

2 Claims. (Cl. 286—11.12)

This invention relates to a device for sealing a rotary member passing through a partition separating two zones, one of which contains a fluid medium at one pressure and the other contains a fluid medium at a different pressure. Where herein I employ the term "fluid," the same is to be understood in its broadest sense, and as therefore embracing liquids and gases. More specifically the invention has reference to a sealing device for the shaft of a rotary pump.

In many types of machines, e. g. a rotary pump, the following desiderata are important in connection with the problem of sealing a rotary shaft with respect to the space in which a fluid under pressure is contained: (1) angular and radial misalignment between the drive shaft and the interior element rotated thereby must be accommodated; (2) consideration must be given to the change in fit of parts made of materials having widely differing coefficients of expansion under variations in temperature, such as would be encountered by devices operating aboard an aircraft, wherein a range of ambient temperature from —65° F. to +150° F. is often specified; (3) the necessity of providing at least one pair of juxtaposed primary sealing faces, one rotating and the other fixed, both of which must be provided with a lapped or other highly finished surface; (4) accessibility of the several parts of seal for maintenance and repair, and with minimum expense thereof; (5) the avoidance of rubbing surfaces of rubber, fiber, asbestos or similar semihard packing materials which have short life under the heat of friction; (6) avoidance of materials which will change dimensions when in contact with aromatic fuels or other liquid being pumped, or, where the use of such material is unavoidable the provision of means to accommodate such change in dimensions.

The objects of this invention are to provide a fluid seal for a rotary shaft which includes proper provision for the foregoing desiderata, and which shall be inexpensive to manufacture, assemble and maintain.

By way of example the invention will be illustrated in a typical environment, namely a rotary, positive displacement pump of the sliding vane type. However it will be apparent from what follows that the invention is equally applicable to analogous uses, as far example where a rotary shaft is to pass through a wall of a fluid container and the pressure of the fluid is superatmospheric.

Figure 2:
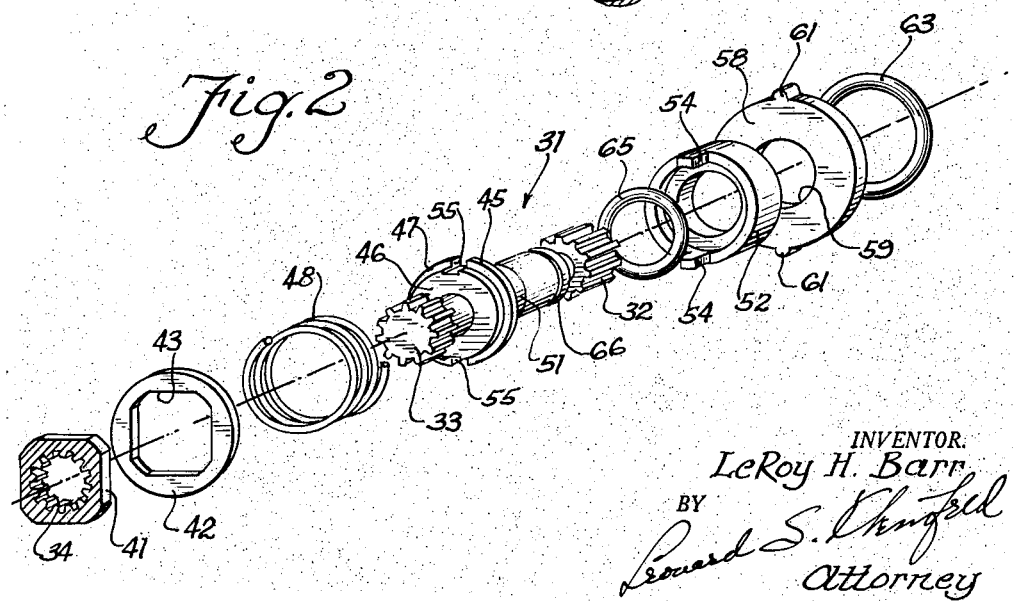

In the drawings:

Fig. 1 is an axial cross-section view of a rotary vane type of positive displacement pump embodying the invention seal; and Fig. 2 is an exploded isometric view of the principal parts comprising the seal.

Referring to the drawing the pump of the example comprises a housing 10 having a cylindrical interior wall 11 to receive a pair of bearings 12 and 13, and a pump liner 15. This latter includes an eccentrically positioned bore 16 within which a rotor 17 is arranged. Rotor 17 carries a plurality of radially positioned vanes 18 supported for sliding movement with respect to the rotor in slots 19. The rotor is provided with axial extensions 21 and 22 whereby the same is rotatably supported in bearings 12 and 13. The foregoing in general is conventional construction for a pump of a common type, and as more adequately described in United States Reissue Patent No. 22,160, granted to W. L. Davis.

Forming a retainer for the bearing 13 and a support for certain elements of the seal to be detailed is lock-nut or closure 25 threadedly engaged with the housing 10 as at 26, and including an annular extension 27 bearing on the outer face of the bearing 13.

In order that any axial misalignment between the driving source (not shown), e. g. an electric motor, and the rotor 17 may be accommodated, it is customary to employ an intermediate shaft 31 connected by means of splined ends 32 and 33 to the motor and rotor respectively. Accordingly the rotor extension 22 is internally splined as at 34 to mate with the male-splined end of the shaft 31. An involute toothed spline comprising an odd number of teeth is preferred, and the fit is such as to allow for expected misalignment of the shaft and rotor without sacrificing driving efficiency or resulting in undue wear. Thus a relatively substantial degree of angular and radial misalignment of the shaft and rotor may be tolerated, as compared to an Oldham or similar quasi-universal joint. Splined end 32 of the shaft 31 is received in a companion female spline in the motor shaft.

Extension 22 of the rotor is provided with a flange 41 to receive a bearing washer 42. In order to facilitate assembly and disassembly while locking the two for joint rotation the washer is provided with a substantially square opening 43 and the flange 41 is correspondingly contoured.

Shaft 31 includes integral adjacent flanges 45 and 46 of different diameters to define a shoulder 47 for receiving one end of a helical compression spring 48, the other end of which finds bearing on the washer 42, and whereby shaft 31 is constantly biased outwardly of the pump.

Received on a portion 51 of the shaft 31 is a rotatable annular sealing member 52, the fit between the bore 53 of this latter and the portion 51 being such that the member 52 is adequately retained in a radial sense but is permitted slight freedom of tilting movement for a purpose to appear. Member 52 is provided with a pair of diametrically opposed tongues 54—54 received in a pair of corresponding notches 55—55 in the flange 45, whereby member 52 is constrained to rotate with the shaft 31. Notches 55—55 are so dimensioned that driving engagement is maintained while the member 52 is permitted floating freedom, and as will be explained.

The closure 25 is provided with a cavity 56, cylindrical except for a pair of diametrically positioned notches 57—57. Received in the space thus defined is a thrust washer 58, having an opening 59 to clear the shaft 31 and a pair of peripherally located protrusions 61—61 adapted to mate with the notches 57—57. Washer 58 is thus restrained from rotation by virtue of sliding friction imparted by the member 52. Assembly and renewal of the washer 58 is thus facilitated and the respective expansion and contraction of the closure 25 and washer 58 are properly accommodated, it being noted that the closure 25 is ordinarily an aluminum alloy and the washer 58 is bronze. Thus the latter may be dropped into position in the cavity 56, and is easily removed for renewal.

Notwithstanding absence of relative rotation between the washer 58 and closure 25 these parts are not a press fit and leakage therebetween is inevitable. Accordingly a toroidal or similar packing 63, e. g. a rubber O ring, is placed in a recess 64 in the closure 25, the depth of the recess being less than the transverse dimension of the packing in order that the latter may be compressed for a tight seal. In addition, and in a similar manner, a packing 65 is placed intermediate the flange 45 and member 52, these two elements being rotatable jointly.

In order to dispose of the minute leakage inevitably resulting, even with the most effectively designed and efficiently functioning seal, the shaft 31 is provided with a slinging groove 66, and the closure 25 has an internal recess 67 in communication via a plurality of ports 68 with a circular collecting channel 69. This latter is in turn in communication through a port 72 with a drain pipe 71.

From the preceding description it will be clear that the spring 48 will rotate with the shaft 31 and rotor 17, and that therefore no frictional drag is presented thereby. The principal seal is effected between the member 52 and thrust washer 58, and inasmuch as the respective abutting surfaces 60 and 70 of these two members are lapped, and member 52 and shaft 31 both have some degree of freedom about the axis of rotation, the spring 48 may exert its force to maintain the members 52 and 58 in sealing contact. Additionally by providing the washer 42 abutting the outer face of the bearing 13 the spring 48 is ineffective in exerting end thrust on the rotor 17. Thus the necessary axial float of the rotor is not in any way diminished by the presence of the spring.

By providing the fixed sealing surface 70 on a disc-like member 58 separate from the closure 25 it is a relatively simple matter to lap the surface to the required degree of flatness and smoothness, as contrasted with some prior sealing structures wherein this surface is constituted by the floor of a cavity. It is well recognized that the production of a properly lapped surface on the floor of a cavity requires the use of a stub arbor, and that the required accuracy of finish cannot be achieved by such means. Moreover, washer 58 is not a press fit in the closure 25, so that under changes in temperature the aluminum or other alloy usually employed for the latter is ineffective to distort the washer, as would otherwise be the case if these two were rigidly united. It will be apparent that any presure radially of a tightly held washer 58 would produce buckling, and therefore a non-planar sealing surface 70.

In the invention structure all rotating elements, including the O rings 63 and 65, are keyed for joint rotation. Accordingly the rings 63 and 65 are never subjected to rubbing friction with concomitant burning.

It will also be apparent that the structure may be used in a pump for fluids which cause swelling of rubber, e. g. aromatic fuels, since any swelling of the rings 63 and 65 will only cause axial displacement of the several members affected by change in transverse dimensions of the rings, and such displacement is immediately accommodated by the spring 48 and without effecting the lapped seal.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. Means for sealing a shaft which operates partly within a housing subject to the presence of fluid therein and one end of the shaft extending exteriorly of the housing which shaft is arranged to drive a member upon which end thrust is undesirable and which housing is provided with two opposed wall portions normal to the axis of rotation, comprising a disc supported in said housing and means for fixing said disc against rotation, an element floatingly supported on said shaft and rotatable therewith, said disc and element having juxtaposed lapped faces for sealing the housing, a ring rotatable with the shaft and driven member and having a flat face bearing on the other end wall of the housing, a shoulder on said shaft, resilient means between said shoulder and ring for biasing said lapped faces into sliding contact, means for locking said ring for rotation with said shaft and driven element, said driven element having a portion journalled in said other end wall of the housing, said portion terminating short of said other end wall in order that said ring is ineffective to contact said portion in any of the axial positions thereof whereby to eliminate end thrust on said driven element, and an axially free, driving connection between the shaft and driven element.

2. Means for sealing a shaft which operates partly within a housing subject to the presence of fluid therein and one end of the shaft extending exteriorly of the housing which shaft is arranged to drive a member upon which end thrust is undesirable and which housing is provided with two opposed wall portions normal to the axis of rotation comprising a disc supported in said housing and means for fixing said disc against rotation, an element floatingly supported on said shaft and rotatable therewith, said disc and element having juxtaposed lapped faces for sealing the housing, a ring rotatable with the shaft and driven member and having a flat face bearing on the other end wall of the housing, a shoulder on said shaft, resilient means between said shoulder and ring for biasing said lapped faces into sliding contact, a resilient element intermediate said shoulder and floating element, means for locking said ring for rotation with said shaft and driven element, said driven element having a portion journalled in said other end wall of the housing, said portion terminating short of said other end wall in order that said ring is ineffective to contact said portion in any of the axial positions thereof whereby to eliminate end thrust on said driven element, and an axially free, driving connection between the shaft and driven element.

References Cited in the file of this patent

UNITED STATES PATENTS

| Number | Name | Date |
| --- | --- | --- |
| 1,934,717 | Johnson | Nov. 14, 1933 |
| 1,993,268 | Ferguson | Mar. 5, 1935 |
| 2,202,912 | Johnson | June 4, 1940 |
| 2,281,157 | Kanuch | Apr. 28, 1942 |
| 2,294,609 | Schlosser | Sept. 1, 1942 |
| 2,365,146 | Wichorek | Dec. 12, 1944 |
| 2,457,643 | Caserta | Dec. 28, 1948 |
| 2,509,973 | Holmes | May 30, 1950 |